Feb. 22, 1966   J. BENNETT ET AL   3,237,093
BORE HOLE LOGGING APPARATUS HAVING RATE OF
DESCENT CONTROLLING MEANS AND A FLEXIBLE
CABLE MEMBER CARRYING A DETECTOR ELEMENT
Filed Oct. 12, 1964   3 Sheets-Sheet 1

*INVENTORS*
JOHN D. BENNETT, PRESTON E. CHANEY,
JACK WEIR JONES & FRED M. MAYES
BY
ATTORNEYS

Feb. 22, 1966    J. BENNETT ET AL    3,237,093
BORE HOLE LOGGING APPARATUS HAVING RATE OF
DESCENT CONTROLLING MEANS AND A FLEXIBLE
CABLE MEMBER CARRYING A DETECTOR ELEMENT
Filed Oct. 12, 1964    3 Sheets-Sheet 2
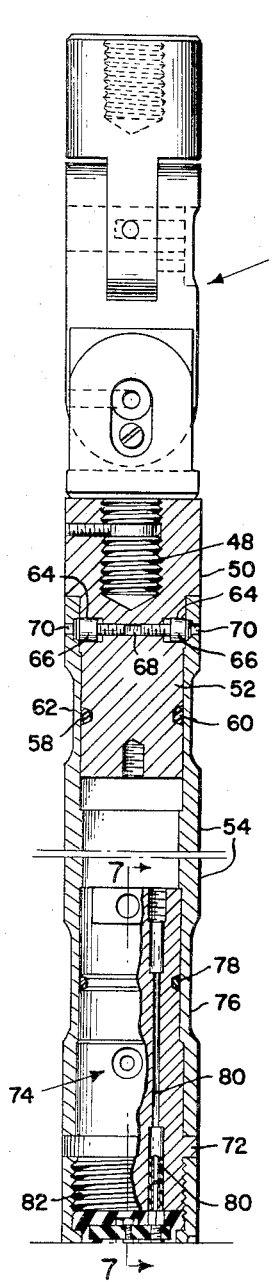
FIG. 5.
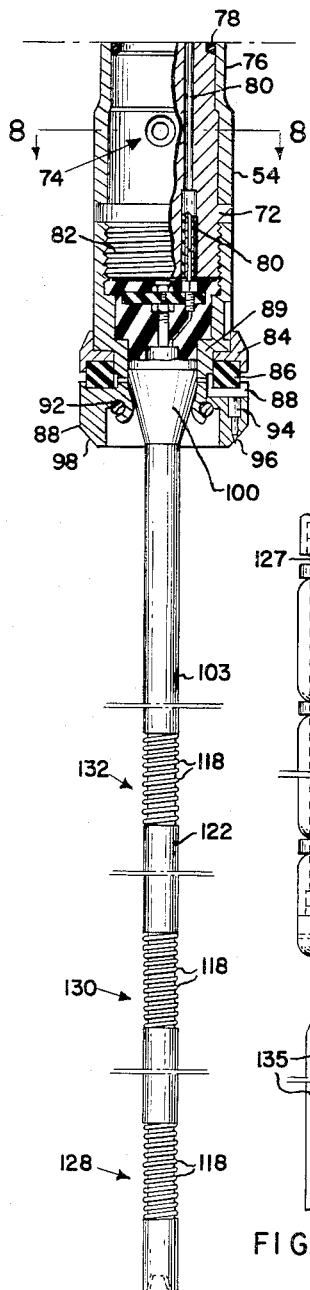
FIG. 6A.
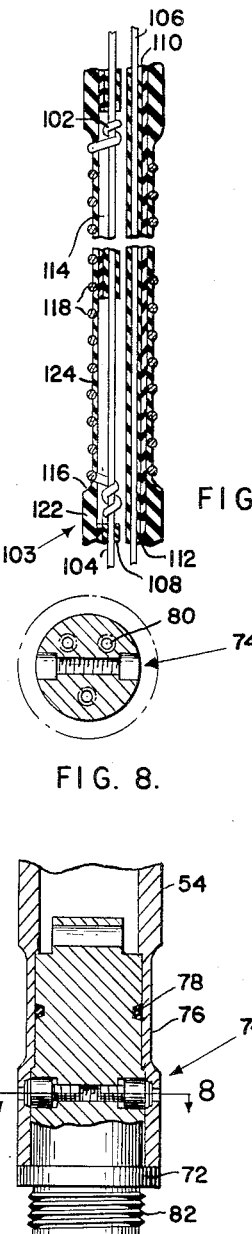
FIG. 6B.     FIG. 7.
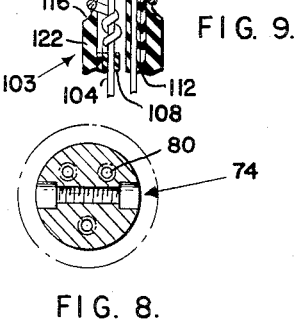
FIG. 9.
FIG. 8.
INVENTORS
JOHN D. BENNETT, PRESTON E. CHANEY,
JACK WEIR JONES & FRED M. MAYES
BY
ATTORNEYS

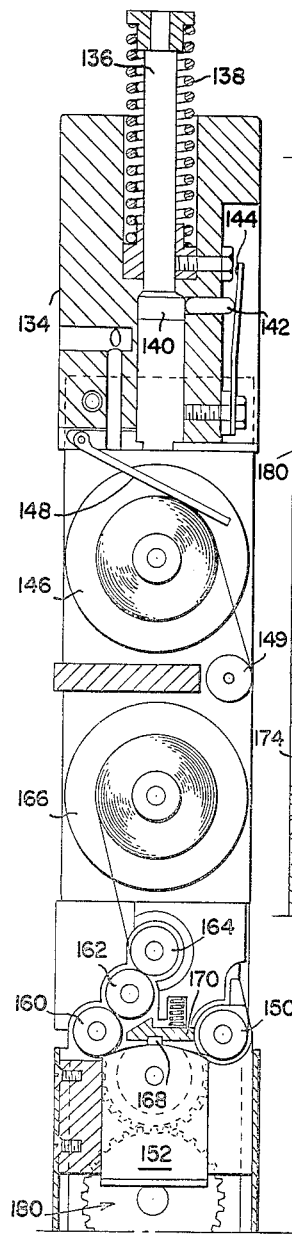
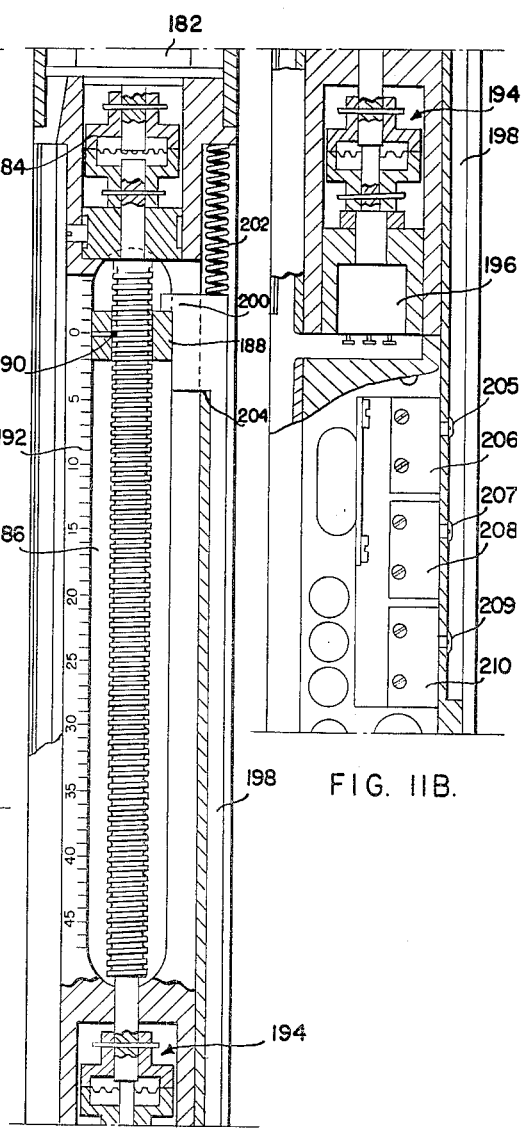
FIG. 10A.  FIG. 10B.  FIG. 11A.  FIG. 11B.
INVENTORS
JOHN D. BENNETT, PRESTON E. CHANEY,
JACK WEIR JONES & FRED M. MAYES
BY
ATTORNEYS 3,237,093
BORE HOLE LOGGING APPARATUS HAVING RATE OF DESCENT CONTROLLING MEANS AND A FLEXIBLE CABLE MEMBER CARRYING A DETECTOR ELEMENT
John Bennett, Richardson, Preston E. Chaney, Dallas, and Jack Weir Jones and Fred M. Mayes, Richardson, Tex., assignors to Sun Oil Company, Philadelphia, Pa., a corporation of New Jersey
Filed Oct. 12, 1964, Ser. No. 405,017
9 Claims. (Cl. 324—1)

This invention relates to bore hole logging apparatus and particularly to apparatus involving the location of recording apparatus within a hole.

This application is in part a continuation of our application Serial Number 818,162, filed June 4, 1959.

Conventional methods of well logging, whether of electrical or other types, involve the absence of the drill stem during the logging operation. This has two serious drawbacks in that not only must special time be consumed in running the well log, during which time the drill stem must be out of the hole, but after a period of drilling, due to the fact that the drill stem must be removed, there is inevitably a delay before the new part of the hole may be logged, during which delay there occurs invasion of the formation by drilling liquid. Since the drill liquid has physical properties of its own, it may, by penetration of porous layers, greatly change their properties so as to interfere with their detection. For example, in the case of electrical logging, the conductivity of the formations, and in the case of acoustic logging the absorption and velocity of sound will be changed, etc.

Proposals have been made to effect electrical logging by using the drill bit or one or more other parts of the drill stem as logging electrodes. In line with this it has been proposed to supply special drill stem tubing containing one or more conductors which are electrically connected in the assembly of the drill stem and extend to recording apparatus at the surface. The use of such an arrangement has been found to be impractical because of high cost and wear.

Proposals have also been made to support one or more electrodes on wire lines to be dropped below a core bit into the lower portion of a hole from which the bit has been raised. This procedure has also proved impractical inasmuch as special handling has been required at the surface, but particularly because core bits are not generally desired for the major drilling activities but are used only for special purposes.

In accordance with the patents of Mayes and Jones, Number 3,065,404, dated November 20, 1962, and of Bennett, Chaney, Mayes and Jones, Number 3,047,794 dated July 31, 1962, logging methods and apparatus are provided which may be used when a drill string is in a bore hole and may be used at any time with a minimum of interruption in drilling. Not only may the logging be accomplished just prior to removal of the drill string for the purpose of changing a bit, but the logging may be carried out to be promptly followed by a continuation of drilling. In accordance with said patents a self-contained energizing and recording apparatus may be dropped through a drill string in go-devil fashion or may be pumped down therethrough when the drill string has been lifted to only a limited extent from the bottom of the hole to provide a region for reception of an electrode or other logging assembly. The apparatus particularly includes an assembly of a type suitable to pass through the mud flow openings of a jet bit which may be of any of the conventional popular types. Such bits are presently widely used since they effect the carrying away of cuttings and avoid their reworking by the drill. These jet openings are generally at relatively small angles with respect to the drill stem axis, and a flexible assembly may, accordingly, be projected therethrough to extend beneath the bit.

The self-contained assembly lowered to the vicinity of the bit contains, for electrical logging, not only means for supplying current to the earth, but also means for recording various potentials at the electrodes of the assembly.

Recording in a self-contained instrument within a drill stem or bore hole has always presented substantial difficulties because of the limited diametral space afforded. Without the possibility of reference to some standard frequency supply line, there is difficulty in providing constant speed of transport of the recording medium. Furthermore, since the apparatus used must be kept to a minimum, stability of measuring circuits is difficult to maintain.

According to the disclosures of said patents, exciting and recording apparatus were provided which were self-contained and sufficiently simple in construction to be housed in apparatus which may pass through a drill stem. A pulse width modulation recording system was used which was essentially independent of supply voltage changes and of the transport speed of the recording medium, specifically, a magnetic tape.

Also avoided in accordance with said disclosure was the difficulty of maintaining constant current to the current electrode or electrodes. The record was dependent solely on the ratios of potentials to the current introduced into the earth, and, consequently, valid and interpretable results were secured in view of the fact that the electrical configuration presented by the earth is linear.

The general object of the present invention is the provision of improved apparatus similar to that disclosed in said patents. The objects of the invention may be more easily appreciated from consideration of the following disclosure and the description of operation, but may generally be said to relate to improved control of the descent of the apparatus within a drill pipe to insure the proper projection of an electrode assembly through and below a bit. Further objects relate to the securing of a good ground contact for the electrical elements of the apparatus. The electrical apparatus involved is not shown herein in detail but is desirably of the type disclosed and claimed in the application of Mayes and Jones, Serial Number 818,066, filed June 4, 1959. However, the electrical apparatus involved may, from the standpoint of the inventions herein claimed, be of other forms, for example, as shown in the Patents 3,047,794 and 3,065,404, referred to above.

Reference will be made particularly to the accompanying drawings, in which:

FIGURE 5 is an enlarged section showing certain details of construction of a portion of the apparatus shown in FIGURE 2;

FIGURE 6A is an enlarged vertical section of the lower portion of the apparatus, also showing in elevation the upper portion of a preferred electrode assembly;

FIGURE 6B is a continuation of the electrode assembly shown in FIGURE 6A;

FIGURE 7 is a fragmentary longitudinal section taken on the plane indicated at 7—7 in FIGURE 5 and showing certain details of construction;

FIGURE 8 is a transverse section taken on the plane indicated at 8—8 in FIGURES 6A and 7;

FIGURE 9 is a diagrammatic fragmentary section showing, in particular, the preferred construction of a typical electrode;

Figure 1:
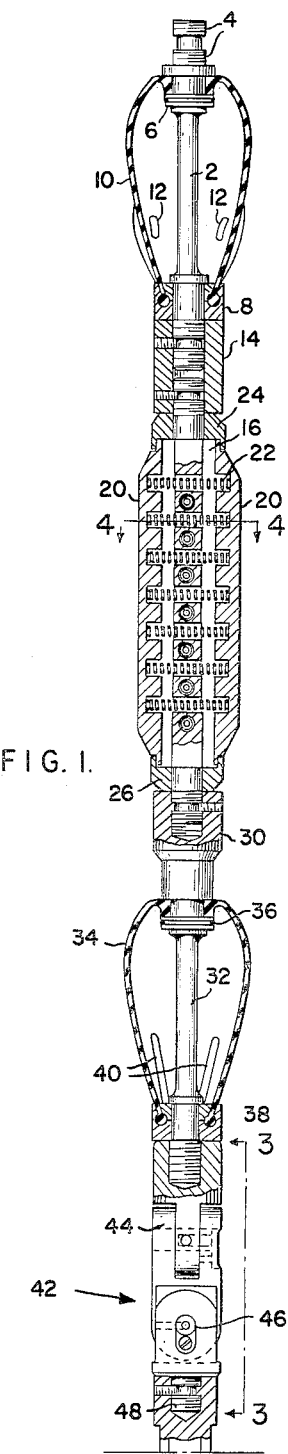
FIGURE 1 is a vertical section taken through the upper portion of a logging apparatus provided in accordance with the invention.
Figure 2:
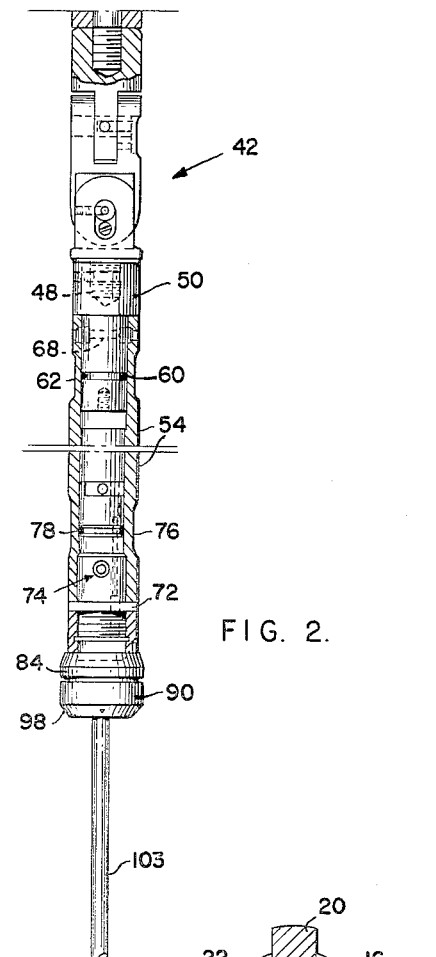
FIGURE 2 is a similar section showing a lower portion thereof.
Figure 3:
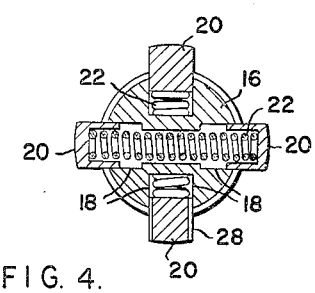
FIGURE 3 is an elevation looking at the right of the lower portion of FIGURE 1 in the region indicated at 3—3 therein.
Figure 4:
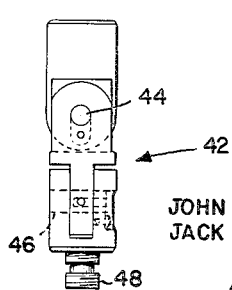
FIGURE 4 is a transverse section of the apparatus taken on the plane indicated at 4—4 in FIGURE 1.

FIGURES 10A and 10B jointly constitute a fragmentary longitudinal section showing the upper portion of a recording assembly, FIGURE 10B providing a continuation of FIGURE 10A; and FIGURES 11A and 11B jointly constitute a similar section showing the lower portion of the same assembly, FIGURE 11B providing a continuation of FIGURE 11A.

Reference will first be made to mechanical aspects of the logging apparatus. As an introduction to the discussion thereof, reference may be made to certain findings with respect to operation of a recording apparatus within a drill stem and involving the projection of an electrode assembly through jet openings of a bit. It was originally assumed that an electrode assembly to be reliably projected through the jet openings of a bit would have to be guided for entrance into the openings, and for this reason there was first adopted a so-called wand assembly having flexibility but a substantial degree of stiffness so that projection could be effected by the guidance of the lower end of the assembly to a jet opening, the assembly then being thrust through the opening by a pushing action on its upper end due to the weight of the recording apparatus and its carrier casing. Subsequently, it was found that special guidance need not be provided, but that such a wand would be very reliably guided into a jet opening by flow of drilling fluid, as disclosed in our patent 3,052,838. Due to the fear that complete reliability might not occur because of the possibility that the wand might take an appreciable but short interval of time to enter properly a jet opening, or might thereafter have its descent interrupted for a short period by friction with the wall of a hole below the bit, or by temporary entrance into a pit in the wall, it was considered desirable to slow down the descent of the recording apparatus so that the latter during its fall would not tend to collapse the electrode assembly. Provision of means for retarding the descent of the apparatus as it approached the position in which the electrode assembly would be about to enter a jet opening was found to eliminate the necessity for having the electrode assembly of substantial stiffness, and in accordance with the present disclosure there is provided an apparatus having a highly flexible electrode assembly and which may be briefly described as follows:

The electrode assembly, which may be of quite considerable length, for example, upwards of 20 feet, is constituted by what is little more than a multi-conductor insulated electrical cable provided with localized electrodes most desirably formed as hereafter described in detail. This assembly has the flexible characteristics of an ordinary electrical cable. At its upper end it is mechanically secured to an elongated housing assembly which contains the recording apparatus. This housing assembly is associated with means for retarding the free descent of the entire apparatus. In particular, a type of "parachute" arrangement is used to permit some degree of retardation of dropping of the apparatus through the drill pipes, so that the flexible electrode assembly will be certain to remain, during the dropping, substantially fully extended by its own weight and by weighting means carried by its lower end. Then, when the lower end of the electrode assembly approaches the jet openings of a bit further retardation of descent is provided by means cooperating with the usual reduced diameter walls of the bore of a drill collar. The lower end of the flexible wand accordingly approaches the jet openings relatively slowly and is guided by the mud flow reliably through one of the openings and passes downwardly below the bit. Due to its high flexibility and to the use of properly constructed weighting means at its lower end it is extremely unlikely that it will be retarded by irregularities in the wall of the hole, and even if it is temporarily retarded it is free to bend and drop over any shelves or other obstructions which may be encountered.

Consistently with the foregoing, the uppermost end of the assembly comprises a stem 2 which is indicated as threaded at 4 for the reception of a spearhead or other device depending upon the fashion in which operation is to occur. While secured to the threads at 4 there may be a coupling arrangement to secure the assembly to a lowering wire line, the assembly, as disclosed, is particularly intended to be dropped in go-devel fashion through a drill stem, and in such case will ordinarily be surmounted by a conventional spearhead which may be later grasped by an overshot attached to a wire line to remove the assembly. However, in other cases, it may be desired to recover the assembly only through the lifting and dismantling of the drill string, and in such case the threads at 4 may be merely protected by a screw cap.

Secured at 6 to the upper end of the stem 2 and at 8 adjacent to its lower end is a parachute element 10 in the form of a bulb-like structure of flexible wear-resisting rubber desirably provided with a plurality of openings 12 for the entrance and exit of drilling fluid. The member 10 is arranged to be of a diameter desirably normally slightly exceeding that of the major portion of the bore of the drill stem through which it is dropped, and by reason of this fact it acts to slow down the relative velocity of the assembly with respect to the velocity of downflow of the drilling fluid. A tendency of the assembly to drop substantially faster than the drilling fluid will cause the bulb to expand and thus it acts, both by fluid friction and to some extent by mechanical friction with the walls, to slow down the descent. It will, of course, be understood that during the lowering the rate of descent may be controlled to a considerable extent by the rate at which the fluid is pumped downwardly. A coupling 14 connects the stem 2 to a mounting body 16 which is provided with longitudinal slots 18 for the slidable reception of elongated shoes 20 which may move radially inwardly and outwardly, being urged outwardly by springs 22 distributed along their length as indicated, outward movement being limited by retaining collars 24 and 26. The outer diameter to which the shoes 20 may move is so restricted that it is less than the internal diameter of the drill stem but greater than the smaller internal diameter of the drill collar. Thus, during the major portion of the descent and until the shoes enter the drill collar they perform no function in effectual retarding of the descent of the assembly. As will have been gathered from what has been previously stated, the arrangement is such that the shoes enter the drill collar shortly before the lower end of the electrode assembly reaches the position of entrance to a jet opening of a bit.

A coupling 30 connects the member 16 to a spindle 32 which, like the spindle 2, serves to mount a rubber parachute at its upper and lower ends as indicated at 36 and 38. The parachute 34 may be the same as that previously described, but is illustrated as involving in its lower portion elongated openings 40 which tend to promote the parachute action. As in the case of the upper parachute, this also serves to slow down the rate of descent relative to that of the drilling fluid by both fluid resistance action and contact with the walls of the drill stem. Both parachutes are, of course, free to collapse further as they enter the reduced bore of a drill collar. The parachutes may be of different diameters if the diameter of the drill pipe is tapered or made up of sections of different diameters as is sometimes the case.

Because of the great length of the entire assembly, it is desirable to provide a universal joint as indicated at 42 to permit the top portion of the assembly to be folded for transportation relative to the lower portion. The universal joint comprises elements which, as will be evident from the drawing, serve for folding about axes 44 and 46 which are at right angles to each other. The lower end of the universal joint is threaded at 48 for attachment to an upper plug 50 of the instrument housing.

The plug 50 has a reduced portion 52 engageable within the upper end of a tube 54 which is broken away in the drawings but which is of considerable length to house the electrical apparatus which will be later referred to. This latter apparatus must be protected against influx of the drilling fluid, very high pressures being encountered in deep holes. A special construction is accordingly here adopted as follows:

An O-ring 60 is located in annular groove 58 in the portion 52 of the plug. Adjacent to the location of this O-ring the walls of the tube 54 are reduced in outside diameter as indicated at 62, providing a flexible tubular portion which by reason of external pressures is susceptible to being compressed radially to engage tightly the exterior of the plug portion 52. This arrangement is adopted to prevent any extrusion of the O-ring 60 into the clearance, required for assembly, between the cylindrical outside surface of the plug portion 52 and the inner cylindrical surface of tube 54. Even though the normal clearance may be very slight, at the great pressures encountered in a bore hole such extrusion and destruction of an O-ring may occur, and it is therefore, desirable to eliminate this clearance entirely when high pressure is applied, by the use of the construction described.

In order to secure the plug and tube 54 together it is desirable to provide, in bores 64 in the plug, members 66 which have stems threaded into a threaded bore 68 in the plug in axial alignment with the bores 64. These plugs have tapered outer ends arranged to be received within the tapered inner ends of openings 70 in the tube 54. By turning them so that they move outwardly a tight engagement is secured without any projection of elements beyond the outer diameter of the tube 54.

The lower end of the tube 54 is closed by a plug 72 which, like the one previously discussed, is provided with an O-ring 78 adjacent to which the tube 54 is relatively thin so as to be collapsible inwardly radially for tight engagement with the plug to prevent extrusion of the O-ring. In the case of the lower plug, securing means is provided at 74 as previously described and as shown particularly in FIGURE 7. The pressure resisting closure means just described is the subject matter of the patent of Preston E. Chaney, No. 3,074,589, dated January 22, 1963.

Bores 80 extend through the lower plug 72 to pass insulated conductors extending from the electrodes. These are tightly packed through this bore to withstand external pressures.

The electrical ground of the apparatus is the drill stem, which provides an extensive vertical ground. To insure grounding of the apparatus casing, to which the electrical ground connections of the internal apparatus are made, a special assembly is desirable as illustrated in FIGURE 6. This comprises a pair of rings 84 and 88 which are assembled on the outside of the lower extension 89 of the housing. Between them is a heavy rubber ring 86, the ring 88 being held in position by a split ring 92, but providing for some freedom of upward movement relative to the member 89. Within the ring 88 there are mounted pins 94 of hard conductive material which have pointed ends 96 projecting slightly beyond the conical seating surface 98 of the ring 88. These pins are electrically connected together by a conducting wire which is electrically connected to the member 89. The drill collar is provided with a seat at its lower portion having a conical surface corresponding to the surface 98, and when the apparatus is seated the pointed ends 96 of the pins are forced into the seat to provide the necessary electrical contact, penetrating scale or other resistive material which may accumulate on the seat. The rubber ring 86 is partially extruded under the pressure of the liquid as the instrument reaches seated positions, thereby providing a considerable spring force to maintain good contact of the conducting pins. When pumping is stopped the weight of the instrument and the drag shoe friction maintains pressure on the ring 86 to maintain good contact even if there are vertical accelerations which might otherwise break contact by leaving the instrument hanging by the drag shoes 20.

The electrode assembly comprises an adaptor portion 100 within which are mounted pins 102 electrically connected to the electrode leads, the pins being arranged to enter sockets in openings 80 from which leads extend for connection to the recording apparatus. The adaptor 100 is of molded insulating material such as rubber and effectively integral with the sheath of the electrode assembly 103.

As has already been indicated, the electrode assembly is fundamentally a multi-conductor insulated electrical cable on which the electrodes are provided. The construction will be clear from consideration of FIGURE 9. At 104 and 106 are shown a pair of conductors of the cable, it being understood that there may be used any number of conductors corresponding to the number of electrodes or other requirements. The insulation of the first of these conductors is indicated at 108 and of the second at 110, the conductor 104 being hereafter considered as the one connected to the electrode illustrated in FIGURE 9. The external insulation of the cable is indicated at 112, and may, of course, be as usual of multiple layer type. To provide an electrode, the outer insulation 112 is slit as indicated at 114 adjacent to the locations of the electrode ends and the conductor 104 to which the electrode is to be connected is stripped of its insulation through the region of the slit. A conductive wire of suitable material for the electrode configuration desired is then wound about the conductor 104 adjacent to one end of the slit as indicated at 116 and soldered or brazed thereto, being then wound as a helix as at 118 about the exterior of the cable insulation, its end then being wound about and soldered or brazed to the wire 104 at 120. It is desirable to have this dual electrical connection with the conductor within the cable without interrupting the continuity of the conductor so that external accidental breakage of the electrode convolutions will not render part of it useless. Following what has been described, the entire cable is then desirably covered with molded insulation indicated at 122, the assembly being completed by scraping away this last coating as indicated at 124 to expose the convolutions of the electrode helix 118. Using a molded rubber such as that which forms the external covering of the cable, the added thickness at 122 will not detract greatly from the flexibility of the assembly. The helical electrode winding is in itself flexible and protected against wear to a considerable extent by its inclusion within the bounding cylinder of the covering 122.

Any number of electrodes may be thus provided as indicated at 128, 130 and 132 in FIGURE 6, each being connected to an individual conductor of the cable. While many electrode configurations may be used, as will become evident, the following description will for the most part be consistent with the use of three electrodes such as indicated in FIGURE 6 of which the lowermost 128 is the current electrode through which current is introduced into the earth, the next electrode 130 being typically about 16 inches from the first electrode 128 and being known as the short normal electrode, while the third electrode 132 may be typically about 64 inches from the current electrode 128 and is known as the long normal electrode, serving also as the self potential electrode. These electrodes are quite remote from the lower end of the supporting assembly and adaptor 100. They may, for example, be of the order of 20 feet or more distant from this adaptor and correspondingly distant, during use, from the drill bit shortly above which the protective housing rests during operation. It may be noted that the particular electrode arrangement just indicated is rather arbitrary and that other arrangements may be used. For example, the self-potential electrode may be any of the three shown, or a separate self-potential electrode may be provided. The sequential arrangement is also open to choice.

At the lower end of the electrode assembly there is the weighting arrangement shown particularly in FIGURE 6B. A coupling at 126 supports a flexible wire cable 127 terminating in a stop member 129, there being threaded on the cable 127 a series of lead weights 131 with rounded upper and lower ends with interposition between pairs of these weights of flexible washers 133, for example, of neoprene. A sufficient number of the weights is used to insure that during lowering the flexible electrode assembly will remain under tension. The arrangement just described provides the necessary flexibility to enable the entire assembly to pass through jet bit openings. At the same time there is provided an arrangement which cannot hang upon tool joints or on shelves in the wall of the hole below the bit. The washers 133 maintain the outside diameter of the weighting assembly to prevent engagement of the depressions between the weights from being arrested by the lower edges of the jet openings during removal of the electrode assembly. A flexible strip 135 of leather or plastic extends from the stop member 129 and facilitates, by its entrainment in the mud flow, the guidance of the electrode assembly into a jet opening in the bit. Instead of this flexible strip, there may be used a number of balls connected by flexible cords or the like as in Patent 3,052,838.

If desired, some or all of the metal weights 131 may be used to constitute the lowermost electrode of the assembly through the use of conductive connections thereto; but when the weights are not to be a part of the electrode configuration the cable 127 carrying them may be of insulating material or may have an insulated covering.

The weighted electrode assembly constitutes the subject matter of the patent of Bennett, Chaney and Mayes, Number 3,149,277, dated September 15, 1964, which shows alternative forms of electrode assemblies which may be used.

Reference may next be made particularly to FIGURES 10A, 10B, 11A and 11B showing the mechanical arrangement of parts of the current-supplying and recording assembly located within the protective housing constituted by the tube 54 and its plugs 50 and 72.

A frame 134, which need not be described in detail, is formed of an assembly of parts and provides mountings for the mechanical and electrical elements of the recorder. At its upper end it mounts a plunger 136 normally extended outwardly by a spring 138, and when in such position, locating a cam 140 so as to act upon a pin 142 to open a switch 144 which constitutes a master switch disconnecting the power-supplying battery from the apparatus. When the plunger is pushed inwardly this switch is closed, the inward movement of the plunger taking place as the top plug is inserted into the protective housing.

A magnetic tape supply reel is indicated at 146, and resting on the tape is a spring-urged arm 148 which constitutes a second switch element grounded to the hub of the tape supply reel when the tape is exhausted. The tape from the supply reel 146 passes over a guide roller 149 and about an idler 150 and thence over the curved face of a multiple channel recording head 152. From this it winds about the successive capstan rollers 160, 162 and 164, which are geared together to provide a positive and uniform drive, thence passing to the takeup roller 166. In its passage over the head 152 the tape is pressed thereagainst by a pad 168 carried by a spring urged lever 170. The capstan rollers are driven by means of gearing indicated at 180 from connections to a battery-powered drive motor indicated at 172. In order to take care of alignment the motor drives through a clutch 174 the shaft of a dual potentiometer 176, to the shaft of which the gearing 180 is connected. It may be here noted that as a result of the drive of the potentiometers at 176 in synchronism with the drive of the tape, the potentiometers at 176 complete single revolutions of their wiping contacts during predetermined advancement of the tape. The recording is thus made independent of maintenance of constant speed of the motor 172.

Another motor 182, which will be referred to as a time delay motor, drives through a clutch 184, provided for alignment, a feed screw 186. A nut 18 is guided to slide longitudinally of this feed screw without rotation and is provided with a spring wire 190 normally engaged with the screw to effect advance of the nut, the wire 190 being manually disengageable to slide the nut to an initial position. A scale 192 which may be conveniently graduated in minutes serves to make possible the positioning of the nut 188 to secure a desired delay in operation as will appear hereafter. An aligning clutch 194 connected to the lower end of the screw serves to drive a potentiometer shown at 196.

A slide 198 is mounted for limited longitudinal movement in the frame and is provided with a step at 200 engageable by the nut 188 as it approaches its zero time position on the scale 192. A spring 202 urges the slide downwardly to a position limited by the stop surface 204. Cam notches 205, 207 and 209 are provided in the slide 198 to effect sequential action of microswitches 206, 208 and 210 as the nut passes beyond its zero position. These notches also restore the microswitches to their original positions after recording is completed.

In view of the fact that the matters claimed herein are those constituting the mechanical elements of the apparatus, the electrical elements are not herein detailed. These may be described in the application of Mayes and Jones, Serial Number 818,066, referred to above. Alternately, they may be of the type disclosed in Patents 3,047,794 and 3,065,404, both referred to above. Other electrical log recorders may also be used.

Preliminary assembly of the apparatus at the surface involves setting of the electrical elements in accordance with the particular recording system which is involved, followed by location of the operating assembly in the protective casing provided by the tube 54.

With the drill stem lifted from the bottom of the hole to provide a space for extension of the electrode assembly below the bit, the assembly is ready for lowering. Just prior to this, the operating apparatus may be started.

As already indicated, the apparatus may be dropped in go-devil fashion, may be lowered on a wire line, or may be pumped down through the drill stem. Its descent through the drill stem is retarded or caused to be approximately at the rate of downflow of mud by reason of the action of the parachutes 10 and 34, and when it enters the drill collar further retardation of descent is effected by the frictional action of the members 20. Ultimately, the electrode assembly will enter and feed through a jet opening in the bit, with the apparatus finally coming to rest with the electrode assembly fully extended and with a ground connection made at the bottom of the drill stem as already fully described.

The operations of the controlling apparatus then take place in a fashion depending upon the type of controlling apparatus, and may be as described in said Mayes and Jones application, Serial Number 818,066.

When the elements of the apparatus are in condition for logging, recording takes place by magnetic marking of the tape. The records which are produced may be correlated with the time records of cessation of drill stem movements by reason of the fact that in reproduction the cessations of such movements may be indicated by records involving no changes of picked up potentials over intervals corresponding to rest conditions of the drill stem. Logging will generally be carried out by raising the drill stem, section by section, though, of course, a checking log may be provided by thereafter again lowering the drill stem.

Final removal of the apparatus may be effected either by removing the entire drill stem or by retrieving the apparatus at the end of a logging operation by means of an overshot engaging a spearhead at the top of the apparatus.

Alternatively, logging may be effected by leaving the drill stem within the hole in a position with the bit raised for the bottom of the hole to permit complete extension of the electrode assembly below the bit. If the electrode assembly is of sufficient length, a portion of the hole may be logged by raising the apparatus by a wire line to log the portion of the hole below the bit. Such an operation may be carried out until the uppermost electrode approaches the bit so closely that there would be substantial interference with the electrical configuration involved by reason of too close a relationship between the uppermost electrode and the bit.

Assuming that the logging is carried out with the apparatus seated above the bit and with the electrode assembly extending therebelow, and by raising of the drill stem with intermittent removal of sections thereof, there must be correlation of the records with the depths at which they are produced.

The correlation of the records with the depths at which they are produced may be carried out in various fashions. Theoretically simple but not too practical is a system in which either the motor 176 is accurately controlled as to speed (so that the zeros of the recording cycles occur at regular intervals) or in which timing marks are produced on the recording tape at clock controlled equal intervals. The former of these systems requires rather elaborate electrical controls when batteries are used as power sources because of isolation of the apparatus from a surface, fixed frequency, alternating current supply. The latter requires a clock synchronized with a surface clock. In both systems elaborate records are necessary at the surface giving a record of depth against time.

It is simpler to permit the tape to advance at a speed corresponding to that of the motor which, though desirably designed for reasonably constant speed despite drain on the driving battery as logging proceeds, may have a speed substantially variable over a long period of time. Using a well built and sufficiently powerful motor, it is found justifiable to assume a constant speed throughout any period of drill stem movement between stoppages for removal of drill stem sections. Furthermore, measurements have shown that it is possible to assume validly that the rate of movement of a drill stem during lifting (or lowering) periods may be held constant. Accordingly, it is possible to use only the logging records above described to correlate the records with depth since absences of changes of the records define those portions made during fixed vertical positions of the drill stem occurring as sections are removed or added. Accordingly by keeping records at the surface of depths corresponding to cessations of vertical movement of the drill stem and by making the assumption of substantially constant speed of tape advance throughout individual vertical movement periods and of uniform lifting or lowering movements (these assumptions permitting interpolation) complete correlation of records with depth may be secured. Doubts which sometimes exist as to the precise points on records at which vertical movements began or ended, for example because of variations in the records due to disturbances of the electrodes caused by mud flow, may generally be resolved by quite valid assumptions that the tape speed was substantially constant throughout several successive periods of vertical movement.

However, it is desirable to provide independent records on the tape of drill stem motions, rotary or vertical, in accordance with the disclosure of the Bennett, Chaney and Mayes Patent 3,141,126, dated July 14, 1964.

The electrode arrangements provided in accordance with the invention, and the corresponding circuit, may be of various types as disclosed in the patents to Fred M. Mayes, Numbers 3,065,406, dated November 20, 1962, 3,103,625, dated September 10, 1963, and 3,141,127, dated July 14, 1964, and in the application of Fred M. Mayes, Serial Number 847,760, filed October 21, 1959.

It will be evident that various details of construction and operation may be modified without departing from the invention as defined in the following claims.

What is claimed is:

1. Bore hole logging apparatus comprising a housing sufficiently small in size to pass through a hollow drill stem including a bit having at least one non-axial opening therein and provided with means for arresting downward movement of said housing at a position above the bit, recording apparatus within said housing, a member extending downwardly from said housing and supported thereby, said member being in the form of a flexible cable without substantial stiffness so that it will pass through said bit opening and extend therebelow when said housing is so arrested, and a detector element carried by the lower portion of said member and positioned thereby below the bit when said housing is so arrested, said member having at least one conductor electrically connecting said detector element to said recording apparatus.

2. Bore hole logging apparatus comprising a housing sufficiently small in size to pass through a hollow drill stem including a bit having at least one non-axial opening therein and provided with means for arresting downward movement of said housing at a position above the bit, recording apparatus within said housing, a member extending downwardly from said housing and supported thereby, said member being in the form of a flexible cable without substantial stiffness so that it will pass through said bit opening and extend therebelow when said housing is so arrested, and an electrode carried by the lower portion of said member and positioned thereby below the bit when said housing is so arrested, said member having at least one conductor electrically connecting said electrode to said recording apparatus.

3. Bore hole logging apparatus comprising a housing sufficiently small in size to pass through a hollow drill stem including a bit having at least one non-axial opening therein and provided with means for arresting downward movement of said housing at a position above the bit, recording apparatus within said housing, a member extending downwardly from said housing and supported thereby, said member being in the form of a flexible cable without substantial stiffness so that it will pass through said bit opening and extend therebelow when said housing is so arrested, and a plurality of spaced electrodes carried by the lower portion of said member and positioned thereby below the bit when said housing is so arrested, said member having conductors individually electrically connecting said electrodes to said recording apparatus.

4. Bore hole logging apparatus comprising a housing sufficiently small in size to pass through a hollow drill stem including a bit having at least one non-axial opening therein and provided with means for arresting downward movement of said housing at a position above the bit, recording apparatus within said housing, a member extending downwardly from said housing and supported thereby, said member being in the form of a flexible cable without substantial stiffness so that it will pass through said bit opening and extend therebelow when said housing is so arrested, and a flexible electrode carried by the lower portion of said member and positioned thereby below the bit when said housing is so arrested, said member having at least one conductor electrically connecting said electrode to said recording apparatus.

5. Bore hole logging apparatus comprising a housing sufficiently small in size to pass through a hollow drill stem including a bit having at least one non-axial opening therein and provided with means for arresting downward movement of said housing at a position above the bit, recording apparatus within said housing, a member extending downwardly from said housing and supported thereby, said member being in the form of a flexible cable so that it will pass through said bit opening and extend therebelow when said housing is so arrested, and a detector element carried by the lower portion of said member and positioned thereby below the bit when said housing is so arrested, said member having at least one conductor electrically connecting said detector element to said recording apparatus, and a bulbous parachute element carried by said housing to restrain the rate of descent of the apparatus through the drill stem relative to liquid therein.

6. Apparatus according to claim 5 in which said parachute element is provided with at least one opening providing for free passage of liquid between its interior and exterior.

7. Bore hole logging apparatus comprising a housing sufficiently small in size to pass through a hollow drill stem including a drill collar and a bit having at least one non-axial opening therein and provided with means for arresting downward movement of said housing at a position above the bit, recording apparatus within said housing, a member extending downwardly from said housing and supported thereby, said member being in the form of a flexible cable so that it will pass through said bit opening and extend therebelow when said housing is so arrested, and a detector element carried by the lower portion of said member and positioned thereby below the bit when said housing is so arrested, said member having at least one conductor electrically connecting said detector element to said recording apparatus, and means associated with said housing frictionally engaging said drill collar to slow down descent of said housing and member, but clearing the portion of the drill stem above the drill collar.

8. Apparatus according to claim 7 in which said means comprises members urged outwardly by springs to engage said drill collar and means limiting said outward movement.

9. Bore hole logging apparatus comprising a housing sufficiently small in size to pass through a hollow drill stem including a drill collar and a bit having at least one non-axial opening therein and provided with means for arresting downward movement of said housing at a position above the bit, recording apparatus within said housing, a member extending downwardly from said housing and supported thereby, said member being in the form of a flexible cable so that it will pass through said bit opening and extend therebelow when said housing is so arrested, and a detector element carried by the lower portion of said member and positioned thereby below the bit when said housing is so arrested, said member having at least one conductor electrically connecting said detector element to said recording apparatus, a bulbous parachute element carried by said housing to restrain the rate of descent of the apparatus through the drill stem relative to liquid therein, and means associated with said housing frictionally engaging said drill collar to slow down descent of said housing and member, but clearing the portion of the drill stem above the drill collar.

References Cited by the Examiner

UNITED STATES PATENTS 3,052,838  9/1962  Bennett et al. _____ 324—10

WALTER L. CARLSON, *Primary Examiner.*